United States Patent [19]

Bradshaw

[11] 4,311,258
[45] Jan. 19, 1982

[54] TUCK POINTING GUN WITH FLEXIBLE PLUNGER

[75] Inventor: Paul C. Bradshaw, Norwood, Mo.

[73] Assignee: Dale W. Clark, Kansas City, Kans.; a part interest

[21] Appl. No.: 154,883

[22] Filed: May 30, 1980

[51] Int. Cl.³ .............................................. G01F 11/00
[52] U.S. Cl. .................................... 222/391; 141/383
[58] Field of Search ............... 222/326, 327, 386, 391; 141/383–386

[56] References Cited

U.S. PATENT DOCUMENTS

| | | | |
|---|---|---|---|
| 3,168,120 | 2/1965 | Cypser | 222/391 X |
| 3,655,101 | 4/1972 | Dorn | 222/326 |
| 4,077,493 | 3/1978 | Spaude et al. | 222/326 X |
| 4,247,023 | 1/1981 | Show | 222/386 |

Primary Examiner—David A. Scherbel
Attorney, Agent, or Firm—Schmidt, Johnson, Hovey & Williams

[57] ABSTRACT

An improved tuck pointing gun for repairing masonry structures and the like is provided which includes an elongated, tubular, mortar-receiving barrel, along with an improved, axially shiftable plunger within the barrel which is selectively shiftable therein through the usual ratchet rod and trigger mechanism associated with such guns. The plunger includes a thin, flat, circular, metallic plate having an annular, flexible member coupled thereto. The flexible member includes a forward beveled lip, a radially restricted portion at the region of the plate, and a rearwardly and outwardly extending annular trailing section which engages the barrel wall. The improved plunger wipes the barrel wall as tuck pointing operations proceed, in order to clear such walls of mortar material; the outlet end of the barrel is further provided with an annular, inwardly extending element which nestingly receives the forward lip of the plunger when the latter is at the end of its stroke, and this further assures substantially complete clearing of the barrel during use. The annular trailing section is designed to permit inward deflection thereof in the event that a flow-preventing blockage is presented at the outlet end of the barrel. This assures that the ratchet rod and trigger mechanism is not damaged when such a blockage occurs.

1 Claim, 4 Drawing Figures

TUCK POINTING GUN WITH FLEXIBLE PLUNGER

BACKGROUND OF THE INVENTION

1. Field of the Invention

The present invention is concerned with an improved tuck pointing gun of the type used by homeowners and others in the repair of brick walls or building facades. More particularly, it is concerned with a tuck pointing gun having an improved, internal, reciprocable plunger which is designed to wipingly engage the internal barrel wall and assure that essentially all of the mortar received therein is expelled during use. In addition, the plunger is designed to yield in the event of a flow-preventing blockage of mortar in the barrel, so that damage to the gun is precluded.

2. Description of the Prior Art

Many owners of older houses are faced with the task of repairing or tuck pointing brick or masonry structures, in order the replace deteriorated original mortar between bricks or the like. While professionals can be hired for this task, this is costly and may not be justified if only a small section of mortar needs replacement and repair. In such cases the homeowner will generally attempt to do the job without resort to professionals.

In order to facilitate the task of tuck pointing, application guns have heretofore been provided. Such guns are of well known construction and include an elongated, tubular, mortar-receiving barrel equipped with a removable, apertured tip cap which allows filling of the barrel. In addition, these prior units include a circular, axially reciprocable plunger within the barrel which is selectively shiftable through use of an elongated ratchet rod secured to the rear of the plunger and in engagement with a trigger pawl. In use, the plunger is first withdrawn to a point remote from the forward outlet end of the barrel, and the latter is filled with mortar. The tip cap is then replaced, and the trigger can be selectively actuated for dispensing mortar through the tip cap.

Although tuck pointing guns of the type described are well known, they are fraught with problems. First, in many prior guns the sliding fit between the plunger and internal barrel wall is less than optimum, with the result that mortar can be left on the barrel wall as the plunger is shifted towards the tip cap. If this residual mortar is allowed to dry on the barrel wall, retraction of the plunger can be difficult and require scraping or cleaning of the barrel itself. This same problem can occur if residual mortar is left within the barrel itself when the plunger is at the forward end of its stroke adjacent the outlet end of the barrel. Here again, if this mortar is allowed to dry, problems of smooth operability and/or cleanout are presented.

Another potentially more serious problem common with prior tuck pointing guns is that the trigger mechanism thereof can be damaged in the event of a blockage of flow of the mortar. That is to say, if a lump or other obstruction is encountered during use of the tuck pointing gun (most commonly if such a lump becomes lodged in or adjacent the dispensing tip), the most common reaction is to exert additional hand pressure on the trigger mechanism in an attempt to force the lump or obstruction through the tip cap. However, this can lead to significant damage to the trigger mechanism, and in fact the latter can become bent to the point where it becomes useless if excessive force is applied.

Prior dispensing guns of the type adapted to receive a self-contained cartridge of mastic or caulk are described in U.S. Pat. Nos. 3,167,219, 2,923,442, 4,022,355, 3,319,841, 2,731,176, and 2,768,768.

SUMMARY OF THE INVENTION

The above problems are in large measure solved by the present invention which provides a greatly improved tuck pointing gun especially designed to assure complete clearance of mortar from the barrel thereof during use, while at the same time minimizing the possibilities of damage to the gun if a flow-preventing blockage is encountered.

The tuck pointing gun of the invention includes the usual elongated, tubular, mortar-receiving barrel, along with an improved plunger within the barrel and means operably coupled to the plunger for selective reciprocable movement thereof during use of the gun. The plunger includes a thin, flat, circular, metallic plate of lesser diameter than that of the barrel, along with an annular, flexible member coupled to the plate and extending outwardly therefrom for sealingly and wipingly engaging the surrounding barrel wall. The flexible member includes structure which permits inward deflection of the barrel-engaging portion thereof in the event of a flow-preventing blockage at the outlet end of the barrel.

In more detail, the annular flexible member presents a forward, beveled lip, a radially restricted portion of a diameter less than that of the barrel at the region of the metal plate, and an elongated, annular, rearwardly and radially outwardly extending trailing section which engages the barrel wall. Preferably, the outlet of the barrel includes an annular, inwardly extending washer-like element which defines a mortar outlet of slightly lesser diameter than that of the remainder of the barrel, with the forward lip portion of the plunger being configured to closely and nestingly fit within the lesser diameter mortar outlet. In this way substantially all of the mortar within the barrel is dispensed during use of the gun. In addition, the engagement of the trailing section of the annular member with the barrel wall assures that the latter is substantially wiped clean of mortar as the plunger is shifted towards the outlet end of the gun.

DESCRIPTION OF THE PREFERRED EMBODIMENT

Figure 1:
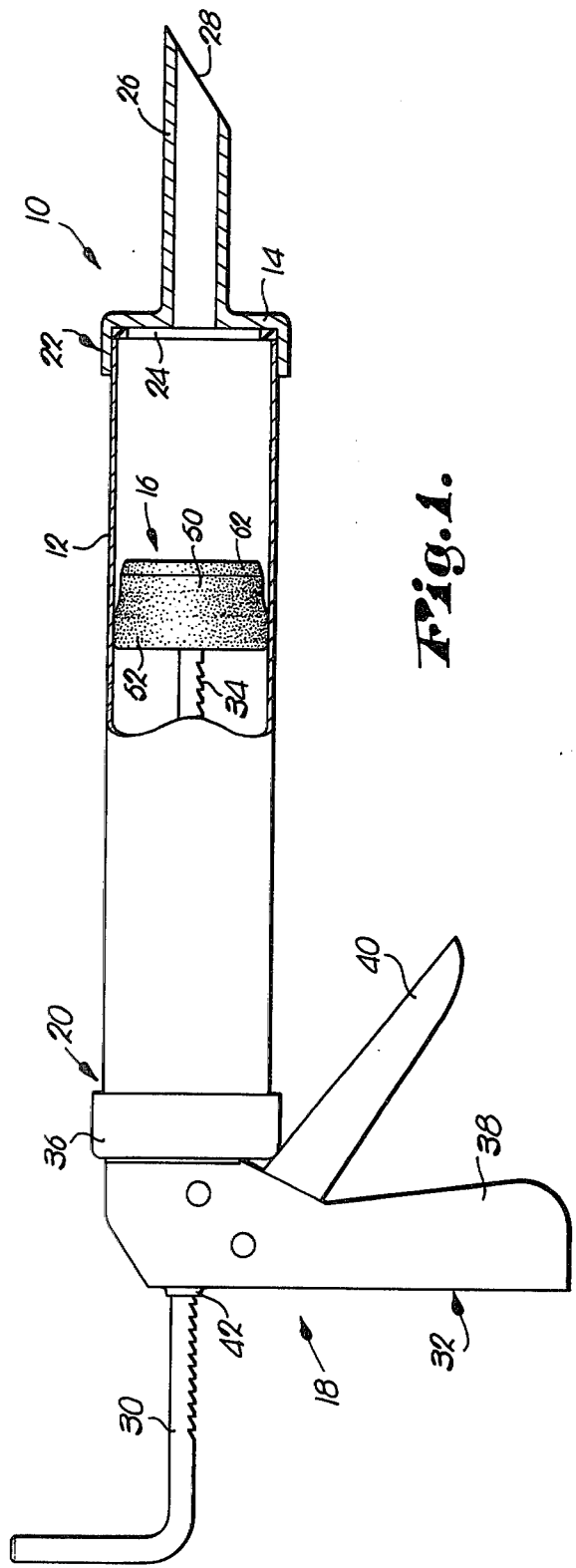
FIG. 1 is a side view in partial vertical section of a tuck pointing gun in accordance with the invention.
Figure 2:
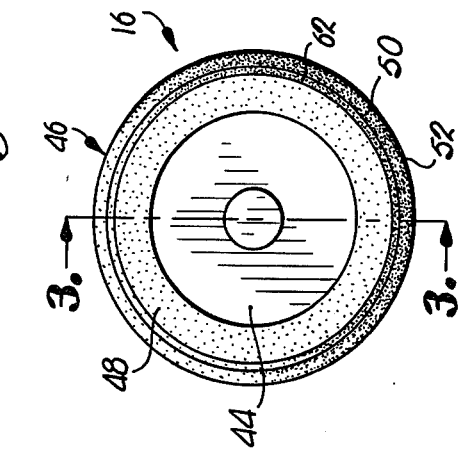
FIG. 2 is a front elevational view of the improved plunger forming a part of the tuck pointing gun.

Turning now to the drawing, a tuck pointing gun 10 in accordance with the invention is illustrated in FIG. 1. The gun 10 includes an elongated, tubular, mortar-receiving barrel 12, means in the form of a tip cap 14 removably secured to the forward end of barrel 12 and defining a mortar outlet, a plunger 16 reciprocably disposed within barrel 12, and means broadly referred to by the numeral 18 for selective forward and rearward movement of plunger 16.

In more detail, the barrel 12 is of essentially tubular configuration and presents a threaded rearward end 20, and a forward outlet end 22. An annular, inwardly extending washer-like element 24 is disposed adjacent outlet end 22 and defines a mortar outlet from barrel 12 of slightly lesser diameter than that of the remainder of the barrel. The purpose of this slight restriction at the barrel outlet will be made clear hereinafter.

Tip cap 14 is of conventional construction and includes a base 26 adapted to fit over the forward end 22 of barrel 12, along with a central, forwardly extending, tubular projection 26 terminating in an oblique tip 28. The projection 26 communicates with the interior of barrel 12, as will be readily appreciated. Further, the tip cap 14 is removably positioned on end 22 by conventional means, such as a bayonet latch (not shown).

The plunger moving means 18 includes an elongated, L-shaped, toothed ratchet rod 30 as well as a pawl-type trigger mechanism 32. The forward end of rod 30 is operably coupled to plunger 16 in the manner to be described, and the rod has a series of juxtaposed ratched teeth 34 thereon.

The mechanism 32 includes a threaded collar 36 adapted to threadably receive the rearward end 20 of barrel 12, along with an apertured, downwardly extending, stationary handle 38. A trigger 40 is pivotally coupled to the handle 38 and spring means (not shown) is provided for biasing the trigger 40 to the FIG. 1 rest position thereof. The trigger is further configured and arranged for manual pivoting thereof in a clockwise direction towards handle 38, in order to initiate operation of gun 12.

The rod 30 extends through an appropriate bearing 42 in handle 38 and into the interior of barrel 12 as illustrated. The rod 30 is axially rotatable relative to the bearing 42 for purposes to be described, and the forward end thereof is secured to plunger 16. Finally, a pawl (not shown) forming a part of trigger 40 is designed to engage the teeth 34 on rod 30, in order to incrementally shift plunger 16 rightwardly as viewed in FIG. 1, in response to successive pivotal manipulations of trigger 40.

As explained above, the entirety of the moving means 18, as well as the operation thereof, is conventional and well known, as those skilled in the art will readily appreciate.

Figure 3:
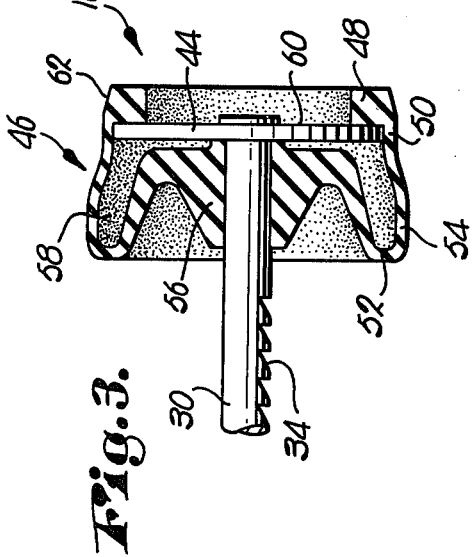
FIG. 3 is a sectional view taken along line 3—3 of FIG. 2.
Figure 4:
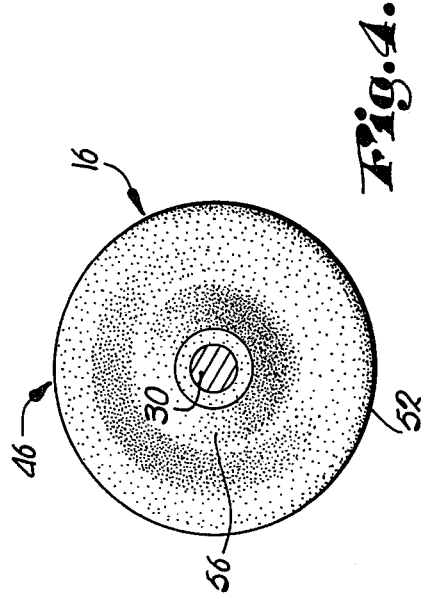
FIG. 4 is a rear elevational view of the plunger.

The plunger 16 includes a thin, flat, circular, metallic plate 44 which is secured to the forward end of rod 30 (see FIG. 3). Moreover, the plate 44 is of lesser diameter than the majority of barrel 12. The plunger further includes an annular, flexible member broadly referred to by the numeral 46 which includes a forward lip portion 48, a radially restricted portion 50, and an elongated, annular, rearwardly and radially outwardly extending trailing section 52 having a barrel wall-engaging surface 54 thereon. The member 46 is of integral construction and is formed of a pliable, rubber-like material. In order to provide adequate support for the member 46, an enlarged boss portion 56 is provided which surrounds and engages rod 30 and the rearward face of plate 44. Additionally, the member 46 is formed to present an internal, annular void 58 in the trailing section 52, and the latter feature is important for reasons to be described.

A lip portion 48 is disposed about the periphery of plate 44, in engagement with the forward face 60 thereof, and extends forwardly therefrom. It should be noted in this respect that the forwardmost edge of lip portion 48 is beveled as at 62 and that the diameter of the lip portion is less than that of the majority of barrel 12.

Radially restricted portion 50 surrounds plate 48 and provides a "necked down" region at the area of the plate 40 and just rearwardly thereof. Trailing section 52 extends from the radially restricted portion 50 and extends outwardly and rearwardly such that the surface 54 is disposed for sealing and wiping engagement with the internal sidewall of barrel 12.

In the use of gun 10, rod 30 is first axially rotated approximately 180 degrees from the FIG. 1 position thereof, until the teeth 34 thereof are free from engagement with the trigger pawl. At this point the rod can be pulled rearwardly towards end 20 of barrel 12 without interference from the trigger pawl. The tip cap 14 is next removed from end 22, and barrel 12 is filled with mortar mix (such would normally be free of gravel), and the tip cap is thereafter replaced upon end 22. The user next rotates rod 30 back to its operative, pawl-engaging position illustrated in FIG. 1, whereupon the user can commence tuck pointing operations while successively pivoting trigger 40 in the known fashion in order to incrementally shift plunger 16 forwardly. This has the effect of dispensing mortar through projection 26 and tip 28, into a space or region to be tuck pointed.

During normal forward travel of the plunger 16 down the length of barrel 12, the wiping and sealing engagement afforded by virtue of the contact of surface 54 with the barrel wall assures that the latter is stripped essentially completely clean of mortar. This is advantageous inasmuch as no substantial quantities of mortar are left on the wall to dry and harden. In the event that a flow-preventing blockage occurs at the region of end 22, such fact is immediately known to the operator by the "feel" imparted through the plunger and thereby to the operating mechanism. In the event, however, that excessive force is applied to trigger 40 in an attempt to expel the obstruction through projection 26, the plunger 16 operates to prevent damage to the mechanism 18. Specifically, the yieldable nature of the member 46, and particularly trailing section 52 thereof, allows the latter to deflect inwardly and thereby relieve any undue pressure buildup caused by the obstruction and the excessive force applied by the user. It will be observed in this respect that the annular void 58 provided in trailing section 52 facilitates inward deflection.

When plunger 16 reaches the end of its stroke at the forward end 22 of barrel 12, the lip portion 48 thereof is received within the slightly lesser diameter outlet defined by the element 24. Of course, the bevel 62 at the forward end of lip portion 48 facilitates nesting of the lip portion within the element 24. In any event, this cooperative relationship of the lip portion 48 and element 24 assures that essentially all of the mortar material originally within barrel 12 is dispensed. Here again, this feature is advantageous inasmuch as no excess mortar remains to dry and harden within the barrel proper.

It will thus be seen that the present invention provides a greatly improved tuck pointing gun especially adapted for use by the homeowner and which overcomes many of the problems and deficiencies common in prior devices of this type.

Having thus described the invention, what is claimed as new and desired to be secured by Letters Patent is:

1. A tuck pointing gun, comprising:
   an elongated, tubular, mortar-receiving barrel;

means adjacent one end of said barrel defining a a mortar outlet;

said outlet-defining means including an annular, inwardly extending element adjacent said outlet end and defining a mortar outlet of slightly lesser diameter than that of the remainder of said barrel;

a plunger disposed within said barrel;

means operably coupled with said plunger for selective movement thereof forwardly toward said one end for dispensing mortar through said outlet, and for selective movement of the plunger rearwardly toward the other end of said barrel for permitting reloading of the barrel with mortar, said plunger including—a thin, flat, imperforate, circular, metallic plate presenting a forward face and a rearward face and of lesser diameter than that of said barrel;

an annular, flexible member coupled to said plate and extending outwardly therefrom for sealingly and wipingly engaging the surrounding barrel wall, said member presenting a radially restricted portion of lesser diameter than that of said barrel about said plate and an elongated, annular, rearwardly and radially outwardly extending trailing section having a portion thereof in engagement with said barrel wall, said barrel-engaging portion being spaced rearwardly from said plate, there being structure permitting inward deflection of the barrel-engaging portion thereof in the event of a flow-preventing blockage at said outlet end, said deflection permitting structure comprising an internal, annular void formed in said trailing section, said member also including an annular forward lip disposed about the periphery of said plate, in overlying engagement with a portion of the forward face thereof, extending forwardly therefrom and of a diameter less than that of said barrel, said lip being circumferentially beveled and arranged to be closely and nestingly received within said restricted diameter mortar outlet such that said plunger serves to substantially completely clear the barrel of mortar when said lip thereof is so nested.

* * * * *